US012252146B2

(12) United States Patent
Mazza et al.

(10) Patent No.: US 12,252,146 B2
(45) Date of Patent: Mar. 18, 2025

(54) METHOD FOR OPERATING A DRIVER ASSISTANCE SYSTEM OF A VEHICLE IN AN ASSISTANCE MODE AND DRIVER ASSISTANCE SYSTEM

(71) Applicant: Robert Bosch GmbH, Stuttgart (DE)

(72) Inventors: Camillo Mazza, Ludwigsburg (DE); Thorsten Schori, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 804 days.

(21) Appl. No.: 17/010,014

(22) Filed: Sep. 2, 2020

(65) Prior Publication Data

US 2021/0107502 A1    Apr. 15, 2021

(30) Foreign Application Priority Data

Oct. 11, 2019  (DE) .......................... 102019215647.9
Mar. 30, 2020  (DE) .......................... 102020204082.6

(51) Int. Cl.
*B60W 50/08*  (2020.01)
*B60W 30/18*  (2012.01)
*B60W 30/188* (2012.01)

(52) U.S. Cl.
CPC .... *B60W 50/087* (2013.01); *B60W 30/18109* (2013.01); *B60W 30/188* (2013.01); *B60W 50/085* (2013.01); *B60W 2540/10* (2013.01); *B60W 2720/106* (2013.01)

(58) Field of Classification Search
CPC ......... B60W 50/087; B60W 30/18109; B60W 30/188; B60W 50/085; B60W 2540/10; B60W 2720/106; B60W 30/165; B60W 30/16; B60W 30/18145
See application file for complete search history.

(56) References Cited

U.S. PATENT DOCUMENTS

| | | | |
|---|---|---|---|
| 5,839,534 A * | 11/1998 | Chakraborty ...... | B60K 31/0008 180/170 |
| 9,718,470 B2 * | 8/2017 | Naab .................. | B60W 30/188 |
| 2005/0021211 A1 * | 1/2005 | Guenthner .......... | B60K 31/047 180/170 |
| 2008/0195292 A1 * | 8/2008 | Naab .................. | B60W 40/107 701/93 |

(Continued)

FOREIGN PATENT DOCUMENTS

EP       4052982 A1 *  9/2022
JP       2006111184 A  4/2006
(Continued)

*Primary Examiner* — Aniss Chad
*Assistant Examiner* — Christopher George Fees
(74) *Attorney, Agent, or Firm* — NORTON ROSE FULBRIGHT US LLP; Gerard A. Messina

(57) ABSTRACT

A method for operating a driver assistance system of a vehicle in an assistance mode. A driver input instantaneously expressed by a driver of the vehicle by an angular position of a gas pedal of the vehicle is converted into a power setpoint value of the vehicle influencing a vehicle acceleration of the vehicle, as a function of an instantaneous vehicle acceleration value of the vehicle and a target acceleration value of a target vehicle, to assist the driver with imitating a driving behavior of the target vehicle.

13 Claims, 1 Drawing Sheet

(56) References Cited

U.S. PATENT DOCUMENTS

| | | | | |
|---|---|---|---|---|
| 2014/0012479 A1* | 1/2014 | Zhao | ............... | B60W 10/18 |
| | | | | 701/96 |
| 2014/0364275 A1* | 12/2014 | Kagerer | ............... | B60W 10/04 |
| | | | | 477/92 |
| 2014/0371981 A1* | 12/2014 | Nordbruch | ............... | G07C 5/0841 |
| | | | | 701/36 |
| 2016/0159352 A1* | 6/2016 | Kim | ............... | B60W 30/143 |
| | | | | 701/93 |
| 2020/0156653 A1* | 5/2020 | Kim | ............... | B60W 30/18163 |

FOREIGN PATENT DOCUMENTS

| | | | | |
|---|---|---|---|---|
| JP | 2006243248 A | 9/2006 | | |
| JP | 201367301 A | 4/2013 | | |
| JP | 201886949 A | 6/2018 | | |
| JP | 201923021 A | 2/2019 | | |
| WO | WO-2015047178 A1 * | 4/2015 | ......... | B60W 30/165 |

\* cited by examiner

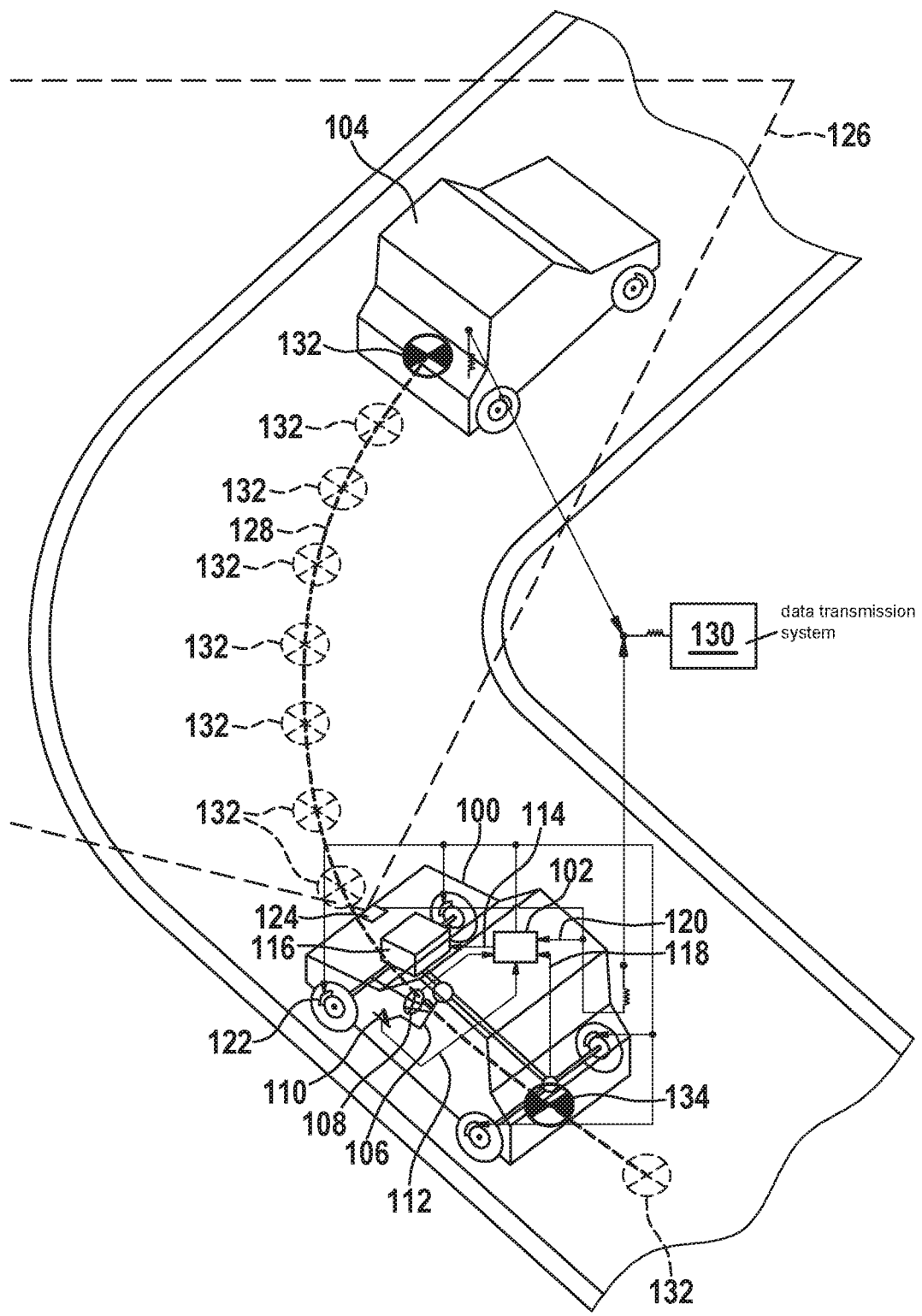

METHOD FOR OPERATING A DRIVER ASSISTANCE SYSTEM OF A VEHICLE IN AN ASSISTANCE MODE AND DRIVER ASSISTANCE SYSTEM

CROSS REFERENCE

The present application claims the benefit under 35 U.S.C. § 119 of German Patent Application No. DE 102019215647.9 filed on Oct. 11, 2019, and German Patent Application No. DE 102020204082.6 filed on Mar. 30, 2020, both of which are expressly incorporated herein by reference in their entireties.

FIELD

The present invention relates to a method for operating a driver assistance system of a vehicle in an assistance mode, and to a corresponding driver assistance system having such an assistance mode.

BACKGROUND INFORMATION

In a vehicle including a distance controller, a situation-dependent setpoint distance from a preceding vehicle is set. When approaching the preceding vehicle, the distance controller reduces an engine power of the vehicle compared to a driver input of a driver of the vehicle tapped at a gas pedal of the vehicle until the vehicle follows the preceding vehicle at the setpoint distance at a speed of the preceding vehicle. The distance controller may, e.g., be deactivated by a kickdown of the gas pedal, for example to pass the preceding vehicle.

SUMMARY

In accordance with the present invention, a method for operating a driver assistance system of a vehicle in an assistance mode, and a corresponding driver assistance system, as well as finally a corresponding computer program product and a machine-readable memory medium are provided. Advantageous refinements and improvements of example embodiments of the present invention may be derived from the description herein.

Specific embodiments of the present invention may advantageously allow a driver of a vehicle to receive assistance with imitating a driving behavior of a, for example preceding, target vehicle. If the driver, for example, does not step on the gas sufficiently to accelerate out of a curve similarly to the target vehicle, the approach described here may, in particular, be used to intervene in an engine management system of the vehicle in order to approximately gain the acceleration of the target vehicle.

Within the scope of the present application and the described present invention, the input of a driver command or driver input is mentioned, in particular, for specifying a vehicle acceleration value or a driver assistance system which is operated by an angular position of a gas pedal. Such a device for inputting a driver command may be a gas pedal, which is actuated by the driver's foot, in the case of two-track vehicles. As an alternative, modifications of this input device which fulfill the same task as the gas pedal are also possible. These are, for example, devices for hand throttle operation, as they are offered as special accessories by most vehicle manufacturers or hand throttle twist levers or speed twist grips, as they are used in single-track vehicles such as motor scooters, motorcycles or in motor-operated three-wheelers (trikes) or quads.

Based on the present disclosure, such alternatives would be understood by those skilled in the art without exercising inventive skills.

Within the scope of the present application, the term "gas pedal" is used hereafter for the sake of easier comprehensibility and easier readability; however all further alternatives are also encompassed thereby, such as driver assistance systems which are controlled by hand throttle grips or hand twist grips or speed twist grips.

In accordance with an example embodiment of the present invention, a method for operating a driver assistance system of a vehicle in an assistance mode is provided, a driver input instantaneously expressed by a driver of the vehicle by an angular position of a gas pedal of the vehicle being converted into a power setpoint value of the vehicle influencing a vehicle acceleration of the vehicle, as a function of an instantaneous vehicle acceleration value of the vehicle and a target acceleration value of a target vehicle, in order to assist the driver with imitating a driving behavior of the target vehicle.

Specific embodiments of the present invention may be considered to be based, among other things, on the features and findings described hereafter.

A driver assistance system of a vehicle may include different functional modules. A functional module may be a distance controller. Another functional module may be an assistance mode.

A drive train of the vehicle may be activated by a power setpoint value. The power setpoint value may essentially be provided via a driver input. The driver input may be read in via a gas pedal of the vehicle. The power setpoint value may be influenced by the driver assistance system.

The distance controller may, in particular, be gas pedal-controlled. An adjusted distance from a preceding vehicle may be influenced by an angular position and/or an angular velocity of the gas pedal in the process. The angular position and/or the angular velocity may represent the driver input.

The distance controller converts the driver input into the power setpoint value as a function of the instantaneous distance. A change in the driver input is converted into a change in the power setpoint value as a function of the instantaneous distance. The closer the instantaneous distance is to a distance target value, the lower the change in the power setpoint value will be.

When the other vehicle decelerates and, as a result, the distance target value is not adhered to, the power setpoint value is reduced and, when needed, a braking system of the vehicle is activated in order to also decelerate the vehicle.

In the assistance mode, the driver assistance system may assist the driver with driving preferably similarly to a target vehicle. The target vehicle may be driven by a trainer, for example. The driver may be referred to as a student or trainee in the process. In the assistance mode, it is possible to switch from the distance to an acceleration of the target vehicle as the target value. The acceleration of the target vehicle may be referred to as target acceleration. The target acceleration may be represented by a target acceleration value. The assistance mode may be activated by a command of the driver. The assistance mode may, for example, be activated at the push of a button.

When the assistance mode is activated, an intervention into the power setpoint value may take place in such a way that an acceleration of the vehicle is adjusted to the target acceleration of the target vehicle. The acceleration of the vehicle may be referred to as vehicle acceleration. The vehicle acceleration may be represented by a vehicle acceleration value. A speed-dependent minimum distance, however, may continue to be adhered to, in order to avoid contact between the vehicles. In other words, the distance controller may also be active in the background when the assistance mode is activated, and may control the distance target value to the minimum distance.

The power setpoint value may be increased when the vehicle acceleration value is smaller than the target acceleration value. The power setpoint value may be reduced when the vehicle acceleration value is greater than the target acceleration value. The power setpoint value may be controlled using the target acceleration value.

The target vehicle may be detected by at least one sensor of the vehicle oriented in the driving direction. The target acceleration value may be ascertained using sensor data of the sensor. For example, a radar sensor of the vehicle may detect the target vehicle. The vehicle may also include a LIDAR sensor or a camera for detecting the target vehicle. A target trajectory of the target vehicle may be calculated from the sensor data.

As an alternative, the target acceleration value may be derived from a target trajectory of the target vehicle read in via an interface to a data transmission system. The target trajectory may map the driving behavior of the target vehicle. A plurality of coordinate points may be stored as the target trajectory.

Each coordinate point may, for example, be assigned a point in time at which the target vehicle has passed the coordinate point. A target speed value of the target vehicle, and also the target acceleration value, may be derived from the target trajectory. The target acceleration value may also be stored directly for each coordinate point. The target trajectory may, for example, be recorded in the target vehicle using a navigation system and be transmitted to the data transmission system. The target trajectory may also be artificially generated. The target vehicle may then, for example, be shown via a head-up system for the driver in front of the vehicle. As a result of the remote transmission of the target trajectory, multiple vehicles may consecutively follow the same target trajectory on the same route.

The target acceleration value detected at a target position of the target vehicle may be used to convert the driver input into the power setpoint value when an instantaneous position of the vehicle essentially corresponds to the target position. A target position may be a coordinate point on the target trajectory. When the vehicle passes the target position, the corresponding target acceleration value may be used. A target position may, for example, be a deceleration point ahead of a curve or an acceleration point at the end of the curve. The deceleration point may be situated unusually far ahead of the curve for a non-trained driver. The target acceleration value may drop drastically at the deceleration point, and also turn negative. The acceleration point may be situated at an apex of the curve. The acceleration point may be situated unusually far ahead of the curve exit for an untrained driver. The target acceleration value may increase drastically at the acceleration point. The target vehicle may already have passed the deceleration point and the acceleration point at past points in time and have decelerated or accelerated there. In this way, safety distances between multiple vehicles may be adhered to.

A braking system of the vehicle may be activated when the vehicle acceleration value is greater than the target acceleration value by more than a braking tolerance range. When the braking system is activated, the power setpoint value may be reduced toward zero. A braking torque of the braking system to be achieved may be predefined by a braking torque setpoint value. By activating the braking system, the driver may, for example, receive assistance with decelerating for a curve. The braking tolerance range may be selectable.

The power setpoint value may be changed when the vehicle acceleration value deviates from the target acceleration value by more than a tolerance range. The vehicle acceleration value may deviate slightly positively or negatively from the target acceleration value. As a result of a tolerance range, the driver may have a natural driving experience. The tolerance range may be selectable.

The power setpoint value may be incrementally changed as a function of a difference between the vehicle acceleration value and the target acceleration value. The greater the difference, the greater a change in the power setpoint value may be. The power setpoint value may be changed in preset steps so that interventions of the assistance mode are noticeable to the driver. During the jump from one step to the next, a noticeable jerk may pass through the vehicle. A level of the steps may be selectable with the aid of presettings.

The power setpoint value may be changed when the driver input is greater than a minimum threshold value. When the driver lets off the gas and obviously no longer wants to or is able to follow the target vehicle, the intervention by the assistance mode may fail to materialize and/or the assistance mode may automatically be deactivated. The minimum threshold value may be proportional to the target acceleration value. During the deactivation of the assistance mode, a different mode of the driver assistance system may automatically be activated. For example, the distance controller may automatically be activated. The minimum threshold value may be selectable.

The power setpoint value may be changed, taking an inertia of the vehicle into consideration. The vehicle inertia may be made up of a response behavior of the drive train of the vehicle and a mass inertia of the vehicle. The target acceleration value may be monitored anticipatorily to detect changes in the target acceleration value at an early stage. Taking the vehicle inertia into consideration, the power setpoint value may be adapted slightly proactively so that the output power of the vehicle may be adapted when the vehicle reaches a location of the change of the target acceleration value.

The example method may, for example, be implemented in software or hardware or in a mixed form made up of software and hardware, for example in a control device.

The present invention described here furthermore provides an example driver assistance system which is designed to carry out, activate or implement the steps of one variant of the method described here in corresponding devices.

In accordance with an example embodiment of the present invention, the driver assistance system may include an electrical device including at least one processing unit for processing signals or data, at least one memory unit for storing signals or data, and at least one interface and/or one communication interface for reading in or outputting data, which are embedded into a communication protocol. The processing unit may be a signal processor, for example, a so-called system ASIC or a microcontroller for processing sensor signals and outputting data signals as a function of the sensor signals. The memory unit may, for example, be a Flash memory, an EPROM or a magnetic memory unit. The interface may be designed as a sensor interface for reading in the sensor signals from a sensor and/or as an actuator interface for outputting the data signals and/or control signals to an actuator. The communication interface may be designed to read in or output the data wirelessly and/or hard wired. The interfaces may also be software modules which are present on a microcontroller, for example, alongside other software modules.

In addition, in accordance with an example embodiment of the present invention, a computer program product or computer program is advantageous, having program code which may be stored on a machine-readable carrier or memory medium such as a semiconductor memory, a hard disk memory or an optical memory, and which is used to carry out, implement and/or activate the steps of the method according to one of the specific embodiments described herein, in particular if the program product or program is executed on a computer or a device.

It is pointed out that several of the possible features and advantages of the present invention are described herein with reference to different specific embodiments. Based on the present disclosure, those skilled in the art will recognize that the features of the driver assistance system and of the method may be suitably combined, adapted or exchanged to arrive at further specific embodiments of the present invention.

BRIEF DESCRIPTION OF THE DRAWING

Specific embodiments of the present invention are described hereafter with reference to the FIGURE. Neither the FIGURE nor the description should be interpreted as limiting the present invention.

FIG. 1 shows a representation of a vehicle including a driver assistance system according to one exemplary embodiment of the present invention.

The FIGURE is only a schematic representation and is not true to scale. Identical reference numerals denote identical or equally-acting features in the FIGURE.

DETAILED DESCRIPTION OF EXAMPLE EMBODIMENTS

FIG. 1 shows a representation of a vehicle 100 including a driver assistance system 102 according to one exemplary embodiment. Vehicle 100 is driving on a closed-off training area here, behind a target vehicle 104 steered by a trainer. A driver 106 of the vehicle attempts to imitate a driving behavior of target vehicle 104 preferably exactly.

Driver assistance system 102 has an assistance mode. Driver 106 has activated the assistance mode via a control element 108 of vehicle 100 to receive assistance during the imitation of the driving behavior. Control element 108 may, for example, be a button on a steering wheel of vehicle 100.

When the assistance mode is activated, a driver input 112 of driver 106 detected via an angular position of a gas pedal 110 of vehicle 100 is not converted directly into a power setpoint value 114 for a drive train 116 of vehicle 100. In the assistance mode, driver assistance system 102 reads in driver input 112, compares a vehicle acceleration value 118 representing an instantaneous acceleration of vehicle 100 to a target acceleration value 120 representing an acceleration of target vehicle 104, and converts driver input 112 into power setpoint value 114, using a result of the comparison. Driver input 112 may be converted directly into power setpoint value 114, as long as vehicle acceleration value 118 is within a tolerance range around target acceleration value 120.

When vehicle acceleration value 118 is less than target acceleration value 120 by more than the tolerance range, driver 106 does not step on the gas sufficiently, and driver input 112 is too small in order to approximately gain target acceleration value 120. As a result, power setpoint value 114 is increased.

When vehicle acceleration value 118 is greater than target acceleration value 120 by more than the tolerance range, driver 106 steps on the gas too much, and driver input 112 is too great. Power setpoint value 114 is therefore reduced. When vehicle acceleration value 118 is too great by so much that vehicle 100 cannot be sufficiently decelerated by reducing power setpoint value 114 alone, a braking system 122 of vehicle 100 is activated in one exemplary embodiment. Braking system 122 may be activated when vehicle acceleration value 118 is greater than target acceleration value 120 by more than a braking tolerance range. Braking system 122 may also be activated when the distance from target vehicle 104 is smaller than a minimum distance.

Power setpoint value 114 may be incrementally increased and/or decreased, so that driver 106 feels that the assistance mode is intervening. The more vehicle acceleration value 118 deviates from target acceleration value 120, the greater the steps may be.

In one exemplary embodiment, target vehicle 104 is actually present and is detected by at least one sensor 124 of vehicle 100. Target acceleration value 120 may be ascertained from sensor data of sensor 124, as long as target vehicle 104 is situated within a detection range 126 of sensor 124. When target vehicle 104 is driving outside detection range 126 and therefore may no longer be detected, or also when target vehicle 104 only exists virtually or as a simulation, target acceleration value 120 may be derived from a target trajectory 128 of target vehicle 104. Target trajectory 128 may be recorded by target vehicle 104 and, for example, be provided via a data transmission system 130. If no actual target vehicle 104 at all exists, target trajectory 128 may be retrieved, for example, from a data memory of vehicle 100.

From target trajectory 128, a target acceleration value 120 may essentially be derived for any target position 132 of target vehicle 104. Since vehicle 100 is driving at a distance behind target vehicle 104, this target acceleration value 120 is used in one exemplary embodiment when an instantaneous vehicle position 134 of vehicle 100 essentially corresponds to target position 132. In particular, this target acceleration value 120 may be used when instantaneous vehicle position 134 is situated on a line through the target position perpendicularly to target trajectory 128.

In one exemplary embodiment of the present invention, the assistance mode is automatically deactivated when driver input 112 is less than a minimum threshold value. In this way, driver 106 may switch off the assistance mode by considerably letting off the gas. The assistance mode is only switched on again after a renewed activation via control element 108. The assistance mode may also be switched off at any time via control element 108. The minimum threshold value may be dependent on target acceleration value 120. For example, the minimum threshold value may have a fixed relation to target acceleration value 120.

In other words, a performance assist is shown in FIG. 1 as an additional feature for a dynamic distance assistance (DDA) function.

Presently, different driver assistance systems exist in vehicles, such as adaptive cruise control (ACC) and highway assist (HWA), which offer the driver increased comfort and enhanced safety. Moreover, further assistance systems deliver a gain in safety due to distance warnings and emergency braking interventions.

In the case of the driver-oriented "dynamic distance assist" (DDA) function, the driver is relieved of the braking with the aid of the pedal to a great extent, rear-end collisions are prevented, and the gas pedal or, in the case of single-track vehicles, the driving twist grip, is nonetheless left to the driver.

In the case of ACC as a self-accelerating function, acceleration and acceleration build-up values are limited, and the function is deactivated when the brake pedal is actuated for reasons of functional safety. The fact that in the case of DDA, the gas pedal remains under control of the driver results in the option of using the full power of sports vehicles, and of also leaving the function active after an actuation of the brake pedal.

In the approach described here, DDA is further developed as a circular track feature for driving events and driving training. The idea is that the participant of a driving event follows a professional driver (follow-the-instructor). Based on his or her experiences, he or she may design the driving style and the lap time in a targeted manner to the skills and the level of the trainee. He or she may also deliberately variably shift the focus between lap time optimization and driving enjoyment.

During driving events on the circular track, a performance assist function may thus be offered during follow-the-instructor events, in addition to the protective aspect of DDA. While DDA already ensures a safety distance, the acceleration behavior may also be incrementally optimized through further assistance. If the driver trainee, during acceleration out of curves, e.g., does not follow the professional driver quickly enough due to gas pedal values which are too low, an incremental, settable elevated acceleration increase assists the driver with following the trainer.

With the aid of the performance assist function, as a supplement to DDA, it is ensured in the process that a settable, maximum distance from the preceding trainer and a certain differential speed are not exceeded.

When the driver requests a certain acceleration, which is greater than a settable threshold value, it is compared to the acceleration which is necessary so as not to exceed a certain distance and a certain differential speed in relation to the trainer. The desired distance and the differential speed are, in particular, dependent on the speed and acceleration of the trainer and of curve radii.

By dispensing with the use of additional control elements after the activation (e.g., at the steering column switch), the focus remains on the race track. This distinguishes the approach, among other things, from existing approaches, such as e.g., lock-on-target.

Only a general option for switching on and off exists (e.g., with the aid of a button).

If the comparison of the actually requested acceleration of the driver via the gas pedal (a_demand) and the necessary acceleration for following (a_required) results in a positive difference (a_required−a_demand>0), this difference may be reduced.

Settable in different steps/modes, the difference (a_demand−a_required) is added to the actually requested acceleration (a_demand) (a_demand+(a_required−a_demand)*f_correction_x) using different factors and offsets.

An acceleration jolt for a short time may also indicate to the driver to increase the acceleration. In the process, the active principle is similar to the braking jolt in emergency braking systems. In this way, the driver trainee may receive assistance with following the professional trainer.

If the driver applies the brake, releases the gas pedal or drops below a certain acceleration requirement, no elevated acceleration increase is permitted, so that the driver trainee is able to suppress an undesirable elevated increase at any time and as quickly as possible.

In addition, it is possible to generally switch off the performance assist function with the aid of a button. In this way, undesirable elevated acceleration increases may be avoided if the distances from the trainer are too great.

If the driver trainee drops below a certain distance or has built up a positive differential speed which is too high, so that his or her acceleration request (a_demand) has to be reduced, DDA assumes the control and limits a_demand to a_allowed, a_allowed also being able to request a deceleration.

With the aid of this performance assist supplement and the transitions to DDA, the driving enjoyment may be enhanced even further. The driver trainee may improve his or her own skills by targeted assistance from the trainer and the function. By dispensing with additional control elements, the focus on the track and the trainer is never lost, and the safety of the driver trainee and of the trainer is ensured in important situations.

It is pointed out that terms such as "including," "having" etc. do not exclude other elements or steps, and that terms such as "a" or "an" do not exclude a plurality.

What is claimed is:

1. A method of a driver assistance system of an ego vehicle in an assistance mode, the method comprising:
    obtaining, as a target acceleration, an identification of an acceleration of a target vehicle;
    obtaining a driver setpoint acceleration that is input by a driver of the ego vehicle by changing an angular position of a gas pedal or by manipulating a hand throttle grip of the vehicle; and
    setting, by the driver assistance system, a power setpoint value of the ego vehicle to bring an actual vehicle acceleration of the ego vehicle to a system acceleration value that is based on and corresponds to the driver setpoint with a modification that is based on a difference between the driver setpoint acceleration and the target acceleration.

2. The method as recited in claim 1, further comprising:
    detecting the target vehicle by at least one sensor of the vehicle oriented in a driving direction of the vehicle; and
    ascertaining the target acceleration using sensor data of the sensor.

3. The method as recited in claim 1, further comprising:
    deriving the target acceleration from a target trajectory of the target vehicle read in via an interface to a data transmission system.

4. The method as recited in claim 1, wherein the target acceleration is the acceleration of the target vehicle at a prior point in time, when the target vehicle was previously located at a current instantaneous vehicle position of the ego vehicle.

5. The method as recited in claim 1, further comprising:
    activating a braking system of the vehicle when the vehicle acceleration value is greater than the target acceleration value by more than a braking tolerance range.

6. The method as recited in claim 1, wherein the modification is provided in response to a determined satisfaction of a condition that the difference between the driver setpoint acceleration and the target acceleration is greater than a tolerance range.

7. The method as recited in claim 1, wherein the modification is made incrementally so that the vehicle acceleration of the ego vehicle is made according to the driver setpoint acceleration without the modification between increment points and is made with the modification at the increment points.

8. The method as recited in claim 1, wherein the modification is made based on satisfaction of a condition that the driver setpoint acceleration is greater than a minimum threshold value.

9. The method as recited in claim 8, wherein the minimum threshold value is changed over time according to changes to the target acceleration, to be at a predefined proportion to the target acceleration.

10. The method as recited in claim 1, wherein the modification is made taking a vehicle inertia of the vehicle into consideration.

11. The method as recited in claim 1, wherein the modification is made by adding to the driver setpoint acceleration a product of the target acceleration multiplied by a predefined correction factor.

12. A driver assistance system of an ego vehicle, the driver assistance system comprising a programmed processor, wherein the programmed processor, when operating in an assistance mode, is configured to:
  obtain, as a target acceleration, an identification of an acceleration of a target vehicle;
  obtain a driver setpoint acceleration that is input by a driver of the ego vehicle by changing an angular position of a gas pedal or by manipulating a hand throttle grip of the vehicle; and
  set a power setpoint value of the ego vehicle to bring an actual vehicle acceleration of the ego vehicle to a system acceleration value that is based on and corresponds to the driver setpoint with a modification that is based on a difference between the driver setpoint acceleration and the target acceleration.

13. A non-transitory machine-readable memory medium on which is stored a computer program that is a executable by a computer of a driver assistance system of an ego vehicle in an assistance mode and that, when executed by the computer, causes the computer to perform a method, the method comprising:
  obtaining, as a target acceleration, an identification of an acceleration of a target vehicle;
  obtaining a driver setpoint acceleration that is input by a driver of the ego vehicle by changing an angular position of a gas pedal or by manipulating a hand throttle grip of the vehicle; and
  setting a power setpoint value of the ego vehicle to bring an actual vehicle acceleration of the ego vehicle to a system acceleration value that is based on and corresponds to the driver setpoint with a modification that is based on a difference between the driver setpoint acceleration and the target acceleration.

* * * * *